United States Patent [19]

Jelks

[11] 3,939,286

[45] Feb. 17, 1976

[54] PROCESS FOR OXIDIZING AND HYDROLYZING PLANT ORGANIC MATTER PARTICLES TO INCREASE THE DIGESTABILITY THEREOF BY RUMINANTS

[76] Inventor: James W. Jelks, Rte. 1, Box 461, Sand Springs, Okla. 74063

[22] Filed: Oct. 21, 1974

[21] Appl. No.: 516,596

Related U.S. Application Data

[63] Continuation of Ser. No. 327,414, Jan. 29, 1973, abandoned.

[52] U.S. Cl. .............. 426/312; 426/635; 426/636; 426/807; 127/37; 426/74
[51] Int. Cl.² ...................... A23K 1/12; A23K 1/18
[58] Field of Search ........... 426/312, 373, 374, 372, 426/807, 635, 636; 127/36, 37; 260/209 R

[56] References Cited
UNITED STATES PATENTS

| | | |
|---|---|---|
| 1,101,061 | 6/1914 | Classen .................................. 127/37 |
| 1,105,607 | 8/1914 | Benjamin ............................... 127/36 |
| 1,428,217 | 9/1922 | Classen .................................. 127/37 |
| 2,295,643 | 9/1942 | Emery et al. ......................... 426/374 |
| 3,212,932 | 10/1965 | Hess et al. ........................... 426/374 |
| 3,523,911 | 8/1970 | Funk et al............................. 127/37 |

Primary Examiner—Norman Yudkoff
Assistant Examiner—Curtis P. Ribando
Attorney, Agent, or Firm—Head & Johnson

[57] ABSTRACT

A process for treating plant organic matter particles to increase the digestability thereof by ruminants including mixing the organic particles with water, a nontoxic acid catalyst to produce a Ph lower than 3.0, and a metallic catalyst of either iron or manganese, oxidizing the mixture under elevated pressure and temperature to fragment the cellulose molecules and break the lignin-cellulose bond, and hydrolizing the oxidized mixture under elevated pressure and temperature to convert at least a portion of the cellulose molecules to saccharides and saccharide acids.

8 Claims, 1 Drawing Figure

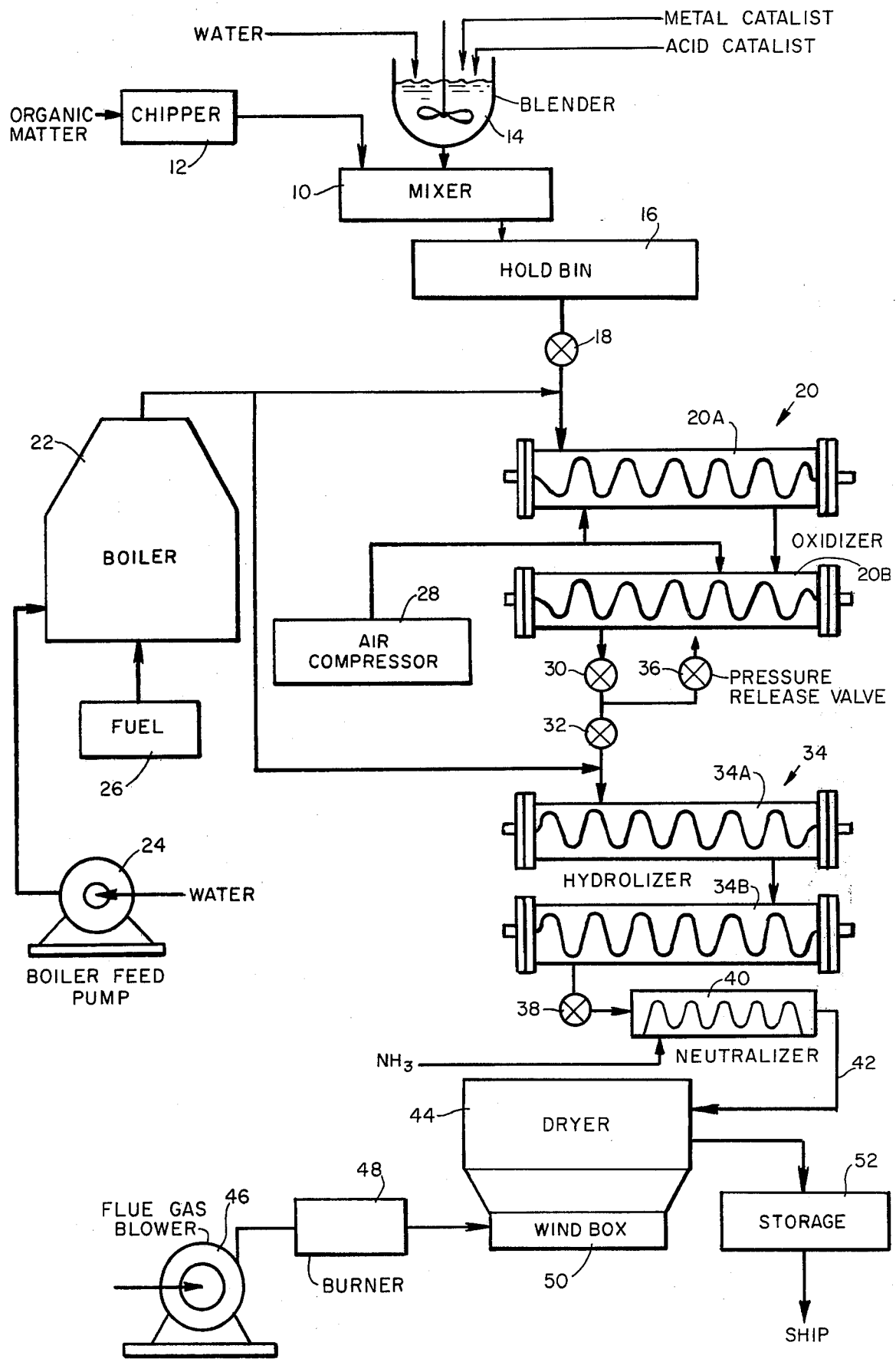

3,939,286

PROCESS FOR OXIDIZING AND HYDROLYZING PLANT ORGANIC MATTER PARTICLES TO INCREASE THE DIGESTABILITY THEREOF BY RUMINANTS

This is a continuation of application Ser. No. 327,414, filed Jan. 29, 1973 and now abandoned.

BACKGROUND, SUMMARY AND OBJECTS OF THE INVENTION

Ruminants, such as cattle and sheep, have the capacity to assimilate cellulose and cellulose byproducts from plant growth, which is not shared by unistomach creatures, such as man. Thus ruminants can digest and grow on organic plant material which provides little or no nurishment for other types of animals. There are some organic plant materials, however, which have a relatively low degree of digestability even to ruminants. These include such materials as ground corncobs, rice hulls, bagasse, wheat straw, oat straw, rice straw, and the trunk, branches, stems and leaves of woody plants such as trees and shrubs. Thus, a very large percent of the organic plant growth on the earth is not available for food material to livestock, such as cattle and sheep, because of the low digestability. The reason that such plant material is not digestable appears to be related to the amount and distribution of lignin content in these types of plant matter. Lignin is an amorphous polymeric material which binds the cellulose together to form the woody cell walls of plant material and in essence forms the cementing material between the cells. In plant material wherein the lignin cellulose bond is tenacious the cellulose cannot be attacked by the micro-organisms living in the stomachs of ruminants and thus the digestability of the material is reduced to a level wherein it will not support life and growth of ruminants.

The basic object of this invention is to provide a process of treating plant organic matter to increase the digestability thereof by ruminants.

More particularly, an object of this invention is to provide a process of treating plant organic matter including matter such as corncobs, rice hulls, bagasse, wheat straw, oat straw, rice straw, and the trunks, limbs, stems and leaves of trees and shrubs and other such similar organic plant matter to increase the digestability thereof by ruminants to the level wherein such material, after having been treated by the process, can function as a feed material for ruminant animals.

Another object of this invention is to provide a process for treating plant organic matter in an arrangement to break at least a portion of the lignin-cellulose bonds of the plant matter and to convert at least a portion of the cellulose molecules to saccharides and saccharide acids so as to increase the digestability of the plant material by ruminants.

These general objects as well as more specific objects of the invention will be fulfilled in the following description and claims, taken in conjunction with the attached drawing.

DESCRIPTION OF THE DRAWING

The drawing is a diagram disclosing the equipment which can be utilized in practicing the process of this invention and showing the flow of an organic matter through the equipment in practicing the process.

DETAILED DESCRIPTION

As previously indicated, the invention is directed to a process for converting organic material which cannot be presently utilized for domestic animals raised for the production of meat, milk, hides and so forth, into usable animal feed. Crops are grown for production of food value to animals, however, much of the organic material produced is not sufficiently digestable to be of value as a feed material. For instance, corn is perhaps the first grown feed material cultivated in America. Corn today is still one of our major agricultural products. However, of the total corn plant produced, only a small portion thereof is sufficiently digestable to be of value. The grain of the corn plant is digestable both by man and ruminants and to a small extent the leaves and corn stalks are slightly digestable by ruminants, although undigestable to nonruminants. However, the level of digestability even in these portions of the corn plant are so low as to be of little value as a feed material for domestic animals. Corncobs are substantially non-digestable to ruminants and of little feed value. Thus, of the total corn product only the small percentage making up the grain kernels are utilized. The same applies to the production of wheat, rice and oats. Only the grain kernels are utilized for animal food. While ruminants can obtain some food value out of wheat, oat and rice straw, the level of the value is so low that little commercially valuable growth is obtained from this material when utilized as animal food and it serves primarily as a filler. Much of the plant growth over a wide portion of the earth is woody plant including trees and shrubs. While trees of certain species and size have value as a source of lumber, the vast majority of the woody plants grown do not reach the size or characteristics to be utilized for lumber and therefore are of little value. Except for the use of nonlumber producing trees for wood pulp much of the trees and shrubs in the nation have little value. This is particularly true of shrub trees such as scrub oak which covers a large part of the United States.

While the chemistry of the substance making up the nondigestable or low digestable portions of the organic plants is rather complex, in essence it appears that the reason such a high percentage of plant growth is not available as a food source for ruminants is that the proportion of the lignin in such plant material is so high as to bind the cellulose in a way to prevent the assimilation thereof by micro-organisms in the stomach of the ruminants. The present disclosure is directed towards breaking the lignin bond sufficiently from the cellulose to thereby release the cellulose cells to assimilation by ruminants and further by increasing the digestability of the cellulose cells by converting at least a portion thereof to saccharides and saccharide acids which are easily assimilated by domestic animals.

The drawing, as previously indicated, sets forth diagrammatically the equipment which may be utilized as one example of a method of practicing the process of the invention. Organic matter of any of the nondigestable or low digestable forms previously indicated forms the raw material for production of feed is delivered to a mixer 10. If the plant organic raw material is of a coarse nature, which would be applicable to most raw material as utilized in the process, it must first be reduced to particles having a maximum size of one quarter inch. Thus the material in most instances is first fed to a chipper 12 which may equally as well be called a chopper or grinder wherein the material is reduced to particles. Generally speaking, the smaller the particle size the better, however, the particle size selected becomes merely a matter of economics since obviously it costs more to grind wood, straw or otherwise into very tiny particles. The type of chipper 12 will depend upon the nature of the organic matter, that is, if the raw material is straw the chipper 12 would be of one type whereas if it is of wood, such as oak or elm tree trunks it would be of an entirely different type, but the output from the chipper 12 into mixer 10 would essentially be the same, that is, small particles or organic material.

In mixer 10 the organic particles are mixed with a liquid base formed in blender 14. The liquid base is formed of water, a metallic catalyst and an acid catalyst. The catalysts are blended with the water and the mixture discharged from the blender 14 into mixer 10 wherein it is thoroughly mixed with the organic particles. The two catalysts serve to increase the rate of reaction and are essential to the process. The metal catalyst is in the form of iron or manganese or derivatives of either of these two metals. While either has functioned satisfactorily the metal catalyst is preferably iron because of its economy. In addition, iron has a nutritive value and most of its derivatives are nontoxic. The metal catalysts can be such as iron and manganese filings; or the mixture of metal in particle form, but the metal catalyst is preferably of some other derivative such as ferric chloride, ferric sulphate, ferric nitrate, and any of the nontoxic salts of iron or manganese. The amount of metal catalyst utilized depends upon the specific catalyst selected, but experience has indicated that a metal catalyst in the amount of about 0.4% of dry weight of the dry weight of the plant organic particles is sufficient.

The acid catalyst may be any nontoxic acid which can be utilized to produce a Ph in the mixture emanating from the mixer 10 of three or lower. While the acid utilized to achieve the desired Ph level may be of many types, those which have functioned satisfactorily include phosphoric, acetic, carbonic, hydrochloric, sulfuric and sulfurous. The only limitation is that the acid must not be toxic to ruminants nor produce a toxic reaction with the organic particles and metal catalyst. The other criteria in selecting the desired acid is economics. The acid selected will depend upon the source available in the area in which the process is being carried out and while other acids can be utilized hydrochloric and sulfuric have proven to be the most effective from the standpoint of cost and are not toxic in the end product in the quantities required.

The mixed liquid from blender 14 is discharged into mixer 10 wherein the organic particles are thoroughly mixed and wetted. From mixer 10 the mixture is discharged into a holding bin 16. The mixture out of mixer 10 is about 40 percent by weight of dry matter to about 60 percent by weight of solution. However, this percentage can vary depending upon the type of organic matter.

The mixture may be held in holding bin 16 without the application of either pressure or heat for a varying length of time depending upon the characteristics of the organic particles forming the raw material, the ambient temperature and the other parameters of the process. Typically, the material is held in holding bin for a period of two to three hours at ambient pressure and temperature to allow complete saturation of the organic particles with the solution.

The mixture is delivered from holding bin 16 through a star valve 18 into an oxidizer 20. The oxidizer is shown in two portions, 20A and 20B, however, the oxidation step may be completed in a single device or in a multiplicity of devices as shown. It should be pointed out that the process of this invention may be carried out either as a batch process or as a continuous process. The illustrated method in the drawing is a continuous process wherein the raw material can pass continuously through to storage, however, it is understood that as to each step the process may be carried out in a batch sequence.

In oxidizer 20 the mixture is subjected to increased pressure and temperature in the presence of oxygen. The preferred temperature of the mixture in the oxidation step is about 105° to 110° C. although temperatures somewhat below and above this range will suffice by varying other parameters. The preferred pressure in the oxidation step is about 150 psig so as to provide about 20 to 30 psig partial oxygen pressure, although this pressure may also vary according to the other parameters and the time assigned to the oxidation reaction step. When the mixture is maintained in the range of about 105° C. to about 110° C. and at a pressure of about 150 psi it has been found that the oxidation step can be completed in about twelve to twenty minutes. In a batch process this would be the length of time the batch would be subjected to these parameters before the step is terminated and the material passed to the next step. In the continuous process as illustrated this means that each organic particle is within the oxidation step at these pressures and temperatures for approximately this length of time, that is, twelve to twenty minutes.

The elevated temperature of the material in the oxidation step may be achieved in a variety of ways. One is by use of steam supplied by boiler 22. Water is fed to the boiler by boiler feed pump 24 and fuel supplied from a source 26. Sufficient steam is emitted into the oxidizer 20 to obtain and maintain the desired temperature. Obviously electric heaters internally of the oxidizer or heat exchanger means within the oxidizer could be used or the oxidizer equipment could be heated by external means. Any arrangement for obtaining the desired temperature of the mixture in the oxidation step would be within the purview of this invention.

Oxidation of the mixture may be obtained by the admission of oxygen in the form of air, oxygen gas, or hydrogen peroxide $H_2O_2$. The amount of oxygen reacted with the mixture in the oxidation step is equal to about 3.75% to 5% by weight of the dry weight of the plant organic matter.

The oxidation step serves the primary purpose of breaking at least a portion of the lignin-cellulose bonds of the plant organic matter and to a secondary purpose of fragmenting at least a portion of the cellulose molecules. By breaking the lignin-cellulose bond the cellulose molecules are subject to subsequent chemical action. While the exact process is not completely understood it appears that the metal catalyst serves in assisting to break the "beta linkage" and the glucose rings in the cellulose chain. A physical breakup is observed visually in the mixer. The solution then weakens the chemical bonds between the glucose groups of the cellulose. It is believed the catalyst attacks the bonds primarily at the junction of the groups. By adding oxygen and a metallic catalyst, such as FeCl to produce $Fe_2OCl$, it is believed that the Fe ion breaks down the lignin-cellulose bond, but as previously indicated, the exact process of the operation is not completely understood. The reaction of oxygen with the cellulose in the presence of the acid and metal catalysts is exothermic. The oxygen added to the oxidizer completes the oxidation. The oxygen may be supplied such as by means of an air compressor 28.

The oxidized mixture is delivered out of the oxidizer through a star valve 30 and passes through another star valve 32 into a hydrolyzer, generally indicated by the numeral 34. The function of star valves 18, 30 and 32 are to permit the passage of the mixture being treated while maintaining isolation of the various portions of the system from the pressures and temperatures of other portions. Between star valve 30 and 32 gas may be vented such as by a means of a pressure release valve 36; the gas being vented to the atmosphere. The gas vented consists basically of nitrogen when oxygen is injected in the form of air into the oxidizer, the nitrogen not taking part in the reaction and accumulating therefore as an excessive gas. By using the space between star valves 30 and 32 the mixture may be vented down to atmospheric pressure so as to eliminate maximum excess gas.

Hydrolyzer 34 is shown in the form of two portions 34A and 34B although, as with the oxidizer, this is by way of illustration only to demonstrate that the hydrolyzation step may be accomplished either in a single apparatus or in a multiplicity of devices and can be accomplished as a batch step or as illustrated, a continuous process. In the hydrolyzer the oxidized mixture is subjected to steam supplied from boiler 22. Hydrolyzation is achieved by subjecting the oxidized mixture to elevated pressure and temperature while the mixture is saturated with steam. The preferred pressure of hydrolyzation is about 135 to 150 psig and the preferred temperature of the reaction is about 180° C. At this pressure and temperature the duration required for the reaction is about three to seven minutes. Obviously, at lower pressures and temperature the reaction time is proportionally longer and the reaction time requirement will vary according to other parameters, including the characteristics of the organic particles, the type and concentration of catalysts and so forth. The hydrolyzation step converts at least a portion of the cellulose molecules to saccharides and saccharide acids. The conversion of the cellulose molecules in the hydrolyzation step takes place as to the cellulose molecules which would be readily available in the organic matter being treated and in addition to those which have been released from the lignin-cellulose bond during the oxidation step. Thus the summation of the oxidation step prior to hydrolyzation substantially increases the sacchrification achieved in the hydrolyzation step.

The output from hydrolyzer 34 passes through an isolating star valve 38 and into a neutralizer 40 wherein the pH of the mixture is raised to about 5.5. This neutralization of the acid catalysts may be achieved in a variety of ways, however, the preferred means is by the use of ammonia. With types of organic matter which is naturally high in organic acid, such as oak trunk, limbs and leaves, additional neutralization may be desired and may be achieved using lime, soda ash, or caustic soda as a substitute for or in conjunction with the $NH_3$.

The output at 42 is a mash high in liquid content that is otherwise available as feed and when the feed is to be consumed at the point of production or nearby it may be fed directly without further treatment. However, due to the high water content shipping would be expensive and storage in such high water content condition would result in deterioration. When the product is to be shipped or stored a further step is provided of delivering the product to a dryer 44. Gas and air are supplied through a blower 46 into a burner which delivers heated air into the wind box 50 of dryer 44. The material is dried to the level desired for subsequent packaging, shipping and storage. The dried material is delivered to storage 52. It may be packaged, sacked, or contained in bulk for shipment.

The process described fulfills all of the objectives set forth initially. While the invention has been described in substantial detail it is understood that the invention is not limited to the embodiment set forth herein, for exemplification, but is limited only by the scope of the attached claim or claims, including the full range of equivalency to which each element or step thereof is entitled.

What is claimed is:

1. A process for treating cellulosic plant matter particles to increase the digestability thereof by ruminants comprising:
   a. mixing said particles with (1) water, (2) an acid catalyst selected from the group consisting of carbonic, sulfuric, phosphoric, hydrochloric and acetic acids to produce a pH of less than 3, and (3) a metal catalyst selected from the group consisting of elemental iron, ferric chloride, ferric sulfate, ferric nitrate, elemental manganese and the nontoxic salts of manganese;
   b. subjecting the resulting mixture to an oxygen partial pressure of from about 20 to 30 psig at an elevated temperature of approximately 105°C to approximately 110°C for 12 to 20 minutes; to effect an exothermic reaction of oxygen with the cellulose in said particles whereby at least a portion of the lignin-cellulose bonds of said particles are broken and at least a portion of the cellulose molelcules are fragmented; and
   c. blowing off resulting gases of oxidation; and
   d. hydrolyzing the resulting oxidized mixture in the presence of the acid and metal catalysts added in step (a); at elevated temperature and pressure of between about 135°C and about 150°C under saturated steam conditions to convert at least a portion of the cellulose into saccharides and saccharide acids.

2. The process of claim 1 in which in step (a) the amount of metal catalyst is about 0.4% dry weight of the dry weight of plant organic particles.

3. The process of claim 1 in which in step (a) the mixture is about 40% by weight of dry matter to about 60% by weight of solution.

4. The process of claim 1 in which in step (b) the amount of oxygen reacted equals about 3.75 to 5% by weight of the dry weight of the plant organic matter.

5. The process of claim 1 in which in step (b) the desired temperature of reaction is achieved by the admission of steam into the reaction mixture.

6. The process of claim 1 in which in step (d) the temperature of the reaction is about 180° C.

7. The process of claim 1 including step (e) in which the hydrolyzed mixture is neutralized sufficiently to raise the Ph thereof to over 4.

8. The process of claim 7 including step (f) in which the neutralized mixture is dried.

* * * * *

UNITED STATES PATENT AND TRADEMARK OFFICE
CERTIFICATE OF CORRECTION

PATENT NO. : 3,939,286
DATED : February 17, 1976
INVENTOR(S) : James W. Jelks

It is certified that error appears in the above—identified patent and that said Letters Patent are hereby corrected as shown below:

Column 6, line 45, change "135°C and about 150°C" to --135 and about 150 psi--

Signed and Sealed this

Twenty-ninth Day of November 1977

[SEAL]

Attest:

RUTH C. MASON
Attesting Officer

LUTRELLE F. PARKER
Acting Commissioner of Patents and Trademarks